United States Patent
Becker et al.

(10) Patent No.: US 6,459,673 B1
(45) Date of Patent: Oct. 1, 2002

(54) APPARATUS FOR HOLDING IN READINESS AND SELECTING AT LEAST ONE STORAGE DISK

(75) Inventors: Volker Becker; Holger Zimmermann, both of Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/271,533

(22) Filed: Mar. 18, 1999

(30) Foreign Application Priority Data

Mar. 18, 1998 (DE) .......................................... 198 11 684

(51) Int. Cl.[7] .............................................. G11B 17/04
(52) U.S. Cl. ...................................................... 369/178
(58) Field of Search .............................. 369/34, 36, 38, 369/75.1, 75.2, 77.1, 77.2, 178, 191, 192, 270, 179; 360/99.02, 99.06, 92

(56) References Cited

U.S. PATENT DOCUMENTS

| | | | | |
|---|---|---|---|---|
| 2,960,340 A | * | 11/1960 | Seidel et al. .................. 369/34 |
| 3,236,525 A | * | 2/1966 | Moody .......................... 369/34 |
| 4,739,425 A | | 4/1988 | Dierkes et al. ................ 360/97 |
| 5,123,005 A | | 6/1992 | Kurosu ....................... 369/77.1 |
| 5,353,179 A | * | 10/1994 | Elliott et al. .................. 369/36 |
| 5,561,657 A | * | 10/1996 | Ogawa ....................... 369/179 |
| 5,754,519 A | * | 5/1998 | Bando ......................... 369/192 |
| 5,808,828 A | * | 9/1998 | Forrer et al. ................... 369/36 |
| 6,097,693 A | * | 8/2000 | Nakamichi .................. 369/270 |
| 6,233,218 B1 | * | 5/2001 | Hoffmann .................... 369/178 |
| 6,252,840 B1 | * | 6/2001 | Miyoshi et al. .............. 369/178 |

FOREIGN PATENT DOCUMENTS

| | | |
|---|---|---|
| DE | 298 00 023 | 4/1998 |
| DE | 0 872 833 | 10/1998 |
| JP | 06 131793 | 5/1994 |
| JP | 10 064160 | 3/1998 |

OTHER PUBLICATIONS

Sound und Fahrvergnugen pur. Mobile Kommunikation von Blaupunkt, Programm (Pure Sound And Driving Enjoyment) Blaupunkt Mobile Communication 1996–97, for example CDC–FO5 or CDC–A05.*

* cited by examiner

*Primary Examiner*—Allen Cao
(74) *Attorney, Agent, or Firm*—Kenyon & Kenyon

(57) ABSTRACT

An apparatus for holding in readiness and selecting at least one storage disk is provided. The apparatus includes threaded rods, each having external threads. The at least one storage disk can be guided in the external threads of the threaded rods. Flights of the external threads coact with individual edge regions of at least one inserted storage disk. The at least one storage disk is displaceable along the threaded rods by rotation of the threaded rods.

10 Claims, 3 Drawing Sheets

APPARATUS FOR HOLDING IN READINESS AND SELECTING AT LEAST ONE STORAGE DISK

FIELD OF THE INVENTION

The present invention is directed to an apparatus for holding in readiness and selecting at least one storage disk.

BACKGROUND INFORMATION

The Blaupunkt catalog "Sound und Fahrvergnügen pur. Mobile Kommunikation von Blaupunkt. Programm '96/'97" (Pure sound and driving enjoyment. Blaupunkt mobile communication. 1996–97 product line) describes apparatuses for holding in readiness and selecting at least one storage disk in the form of compact disc changers, for example, "CDC-F05" or "CDC-A05".

SUMMARY

The apparatus according to the present invention, in contrast to prior devices, has an advantage that the at least one storage disk can be guided in external threads of the threaded rods, with flights (turns) of the external threads coacting with individual edge regions of at least one inserted storage disk. It is thus not necessary to support the storage disk in a drawer guided by the flights of the external threads, thus, material and weight can be saved. Since a drawer is unnecessary, access to a storage disk held in readiness in the apparatus is also simplified. The coaction of the flights of the external threads with individual edge regions of the at least one inserted storage disk, and the fact that a drawer is thus not necessary for storing the storage disk, make it possible for the storage disk to be displaced along the threaded rods, by rotation of the threaded rods, with relatively little energy expenditure and particularly smoothly.

It is particularly advantageous that the at least one storage disk can be guided directly in the flights of the threaded rods. This minimizes the material outlay for guiding the at least one storage disk in the flights of the threaded rods, and thus minimizes weight and cost. It is also possible to stack several storage disks more closely one on top of another, since no drawers or other space-consuming additional holding apparatuses for the storage disks are necessary between the individual storage disks. The flights can thus be implemented with a small spacing between one another.

Because of the direct guidance of the at least one storage disk in the flights of the threaded rods, it is also possible to achieve minimal lateral dimensions for the apparatus, since no additional retainers for the at least one storage disk on its edge are necessary.

Because of the material and, thus, weight for additional holding apparatuses of the at least one storage disk saved by direct guidance of the at least one storage disk in the flights of the threaded rods, the energy expenditure necessary for displacement of the at least one storage disk along the threaded rods by rotation of the threaded rods is reduced, and the smoothness with which the at least one storage disk runs in the flights of the threaded rods during that displacement is improved.

A further advantage is that the at least one storage disk can be supported in grooves of individual and mutually independent sleeves which can be guided in the flights of the threaded rods. The result of this is that the at least one storage disk is protected from wear in its edge region, since it is guided in the flights of the threaded rods not directly but rather via the mutually independent sleeves.

A further advantage is that the sleeves effect a certain tolerance compensation, so that the storage disk is protected from bending due to, for example, non-uniformities in the rotation speed and/or the pitch of the threaded rods. The at least one storage disk is thereby once again handled more gently and protected from wear.

A further advantage is that the sleeves can be guided along the threaded rods on frames. The sleeves are thereby prevented from twisting.

A further advantage is that the external threads are configured in the same direction. This means that the at least one storage disk can roll in the flights of the threaded rods during transport, since upon displacement along the threaded rods, the at least one storage disk can perform an additional rotation. The favorable friction conditions between the flights of the threaded rods and the at least one storage disk can thus be exploited.

The energy expenditure required for displacement of the at least one storage disk along the threaded rods by rotation of the threaded rods is thereby further decreased, and the smoothness with which the at least one storage disk runs in the flights of the threaded rods during that displacement is further enhanced.

Because of the rolling friction of the at least one storage disk in the flights of the threaded rods, the threaded rods can advantageously be made from elastic material, and the at least one storage disk can be guided with zero clearance in the flights of the threaded rods. Additional space can be saved especially by the zero-clearance configuration, both in the lateral dimensions of the apparatus and also by closer stacking of several storage disks in the apparatus. Due to the use of an elastic material for the threaded rods, for example, wear in the edge regions of the at least one storage disk during displacement along the threaded rods can be further reduced, and a tolerance can be achieved, in the event of non-uniformities in the rotation speed and/or pitch of the threaded rods, for the mounting system of the at least one storage disk in the apparatus, so that it remains largely protected from bending and the wear brought about thereby.

A further advantage is that the external threads of the threaded rods have a much greater pitch in a first region than in other regions. This results in a high advance speed during displacement of the at least one storage disk in the first region, and thus a greater spacing between a storage disk currently located in the first region and adjacent storage disks, whereas storage disks located in the other regions rest directly against one another. This makes it possible to bring a storage disk selected for reading and/or writing into a predefined position, and to create a safe spacing from the adjacent storage disks. The storage disk can then easily be moved to a fixed-height playback apparatus and/or a read head can penetrate between the storage disks.

DETAILED DESCRIPTION

Figure 1A:
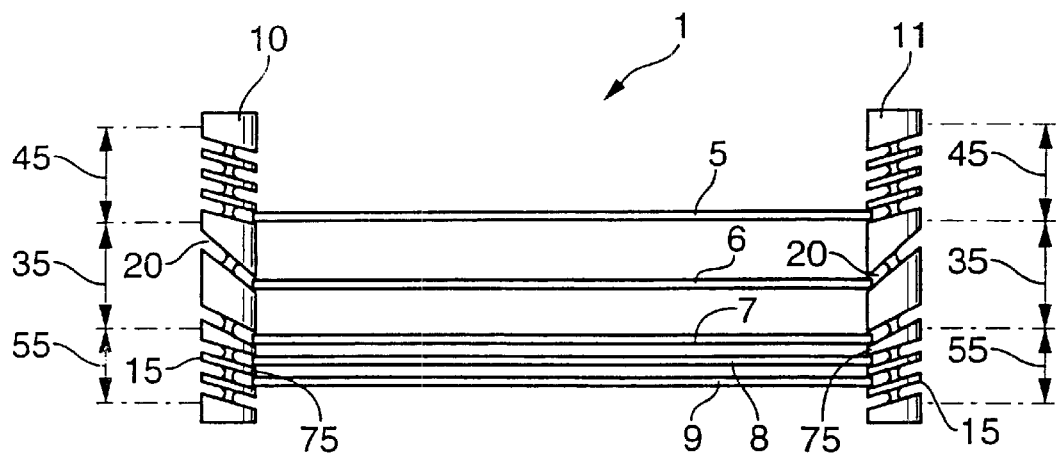
FIG. 1a shows a side view of a first exemplary embodiment of an apparatus according to the present invention for holding in readiness and selecting at least one storage disk.
Figure 1B:
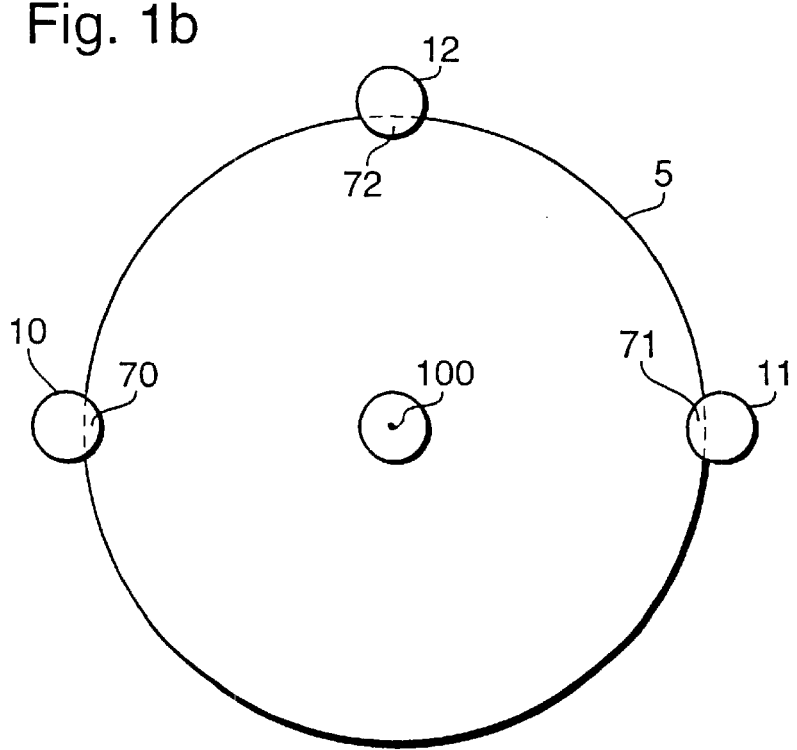
FIG. 1b shows a plan view of the first exemplary embodiment of the apparatus according to the present invention.

FIG. 1a shows a side view of an apparatus 1 according to the present invention for holding in readiness and selecting storage disks 5–9, such as may be arranged, for example, in a compact disc changer. Optical, magnetic, or magneto-optical storage disks, or the like, can be provided as the storage disks. Apparatus 1 comprises at least three threaded rods 10, 11, 12, of which a first threaded rod 10 and a second threaded rod 11 are depicted in FIG. 1a. As shown in a plan view in FIG. 1b, the at least three threaded rods 10, 11, 12 are arranged, each offset approximately 90°, in an edge region of the annular disk-shaped storage disks 5–9. FIG. 1b also depicts a first storage disk 5.

Figure 2B:
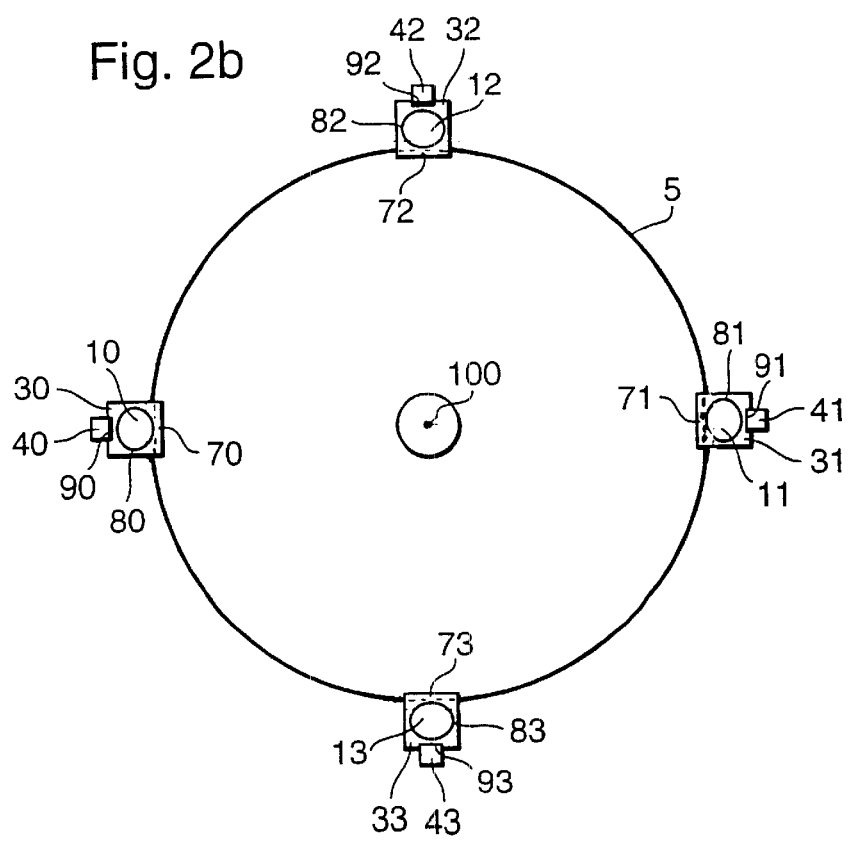
FIG. 2b shows a plan view of the second exemplary embodiment of the apparatus according to the present invention.
Figure 3:
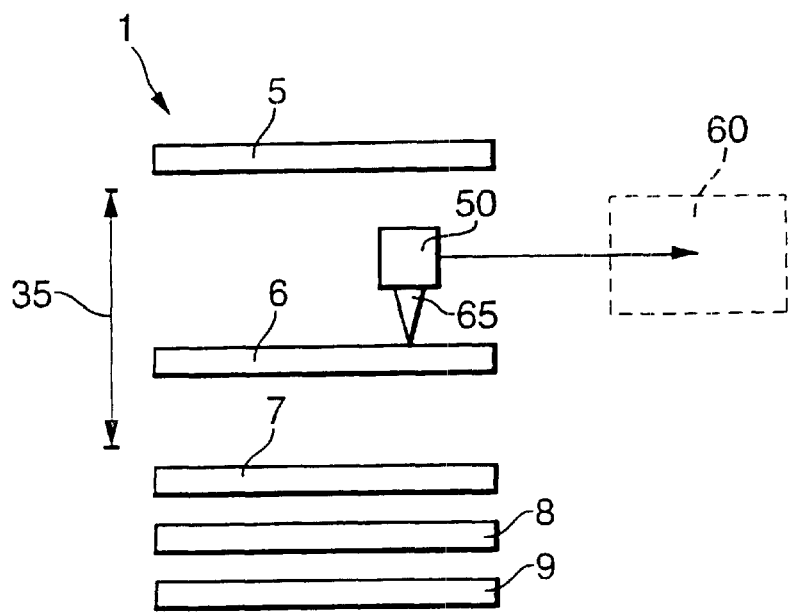
FIG. 3 shows a read head, penetrating into an apparatus according to the present invention, of a playback apparatus.

As shown in FIG. 1a and FIG. 1b, first threaded rod 10 and second threaded rod 11 exhibit approximately centrical symmetry with respect to a respective center point 100 of the concentrically arranged storage disks 5–9, whereas a third threaded rod 12 is not located opposite any threaded rod with respect to center point 100. Optionally, however, in accordance with the exemplary embodiment depicted in FIG. 2b, a fourth threaded rod 13 can also be provided opposite third threaded rod 12. If fourth threaded rod 13 is omitted, however, sufficient space is present on the side of the corresponding storage disk opposite third threaded rod 12 with respect to center point 100 for removal of the corresponding storage disk from apparatus 1, or for penetration of a read head 50 as shown in FIG. 3 into apparatus 1. When fourth threaded rod 13 is used, removal of a storage disk is possible only with difficulty, so that read head 50 must penetrate into apparatus 1 for playback.

Threaded rods 10–13 each have external threads 15. External threads 15 are divided into three regions 35, 45, 55. A first region 35 is arranged between a second region 45 and a third region 55, and constitutes a center region of the respective threaded rod 10–13, whereas second region 45 and third region 55 each constitute an edge region of the respective threaded rod 10–13. First region 35 is characterized by a greater pitch of the respective external threads 15 as compared with second region 45 and third region 55. Approximately the same pitch for external threads 15 can be selected in each case in second region 45 and in third region 55. All the threaded rods 10–13 that are used are configured symmetrically with respect to one another, so that they have approximately equal dimensions and pitches for external threads 15 in the three regions 35, 45, 55.

The five storage disks 5, 6, 7, 8, 9 depicted in FIG. 1a are guided in the external threads of the three threaded rods 10, 11, 12 provided in accordance with FIG. 1b. Flights 20 of external threads 15 coact with three edge regions 70, 71, 72 of storage disks 5–9 placed into apparatus 1 by engaging a first edge region 70 of storage disks 5–9 into a respective flight 20 of first threaded rod 10, and engaging a second edge region 71 correspondingly and respectively into a flight 20 of second threaded rod 11, and engaging a third edge region 72 correspondingly and respectively into a flight 20 of third threaded rod 12. This is depicted in FIG. 1b in a plan view with reference to first storage disk 5. Storage disks 5–9 can thus be displaced along the three threaded rods 10, 11, 12 by rotation of the three threaded rods 10, 11, 12. Storage disks 5–9 engage with their respective edge regions 70, 71, 72 directly into the corresponding flights 20 of threaded rods 10, 11, 12, and are directly guided in those flights 20.

As shown in FIG. 1a, first storage disk 5 is located in second region 45, a second storage disk 6 in first region 35, and a third storage disk 7, a fourth storage disk 8, and a fifth storage disk 9 in third region 55. Because of the direct guidance of storage disks 5–9 in flights 20 of threaded rods 10, 11, 12, storage disks 5–9 are spaced apart from one another in each case by only one thread flank 75 between the individual flights 20, so that they can be stacked one on top of another with maximum density in apparatus 1. The spacing of second storage disk 6 in first region 35 from the adjacent first storage disk 5 in second region 45 and the adjacent third storage disk 7 in third region 55 is, however, respectively greater than the spacing between the adjacent storage disks 7, 8, 9 in third region 55, which is attributable to the greater pitch of external threads 15 in first region 35.

The pitch of external threads 15 in first region 35 is much greater than in second region 45 or third region 55.

When external threads 15 of threaded rods 10, 11, 12 are configured in the same direction, storage disks 5–9 can roll in flights 20 of threaded rods 10, 11, 12 as they are displaced along threaded rods 10, 11, 12, so that favorable friction conditions between threaded rods 10, 11, 12 and storage disks 5–9 can be exploited. With the configuration of external threads 15 in the same direction, the individual storage disks 5–9 can thus additionally rotate as they are displaced along threaded rods 10, 11, 12. Because of the rolling friction, threaded rods 10, 11, 12 can preferably be made from elastic material, or can be coated with elastic material, and storage disks 5–9 can be guided with zero clearance in flights 20 of threaded rods 10, 11, 12.

Figure 2A:
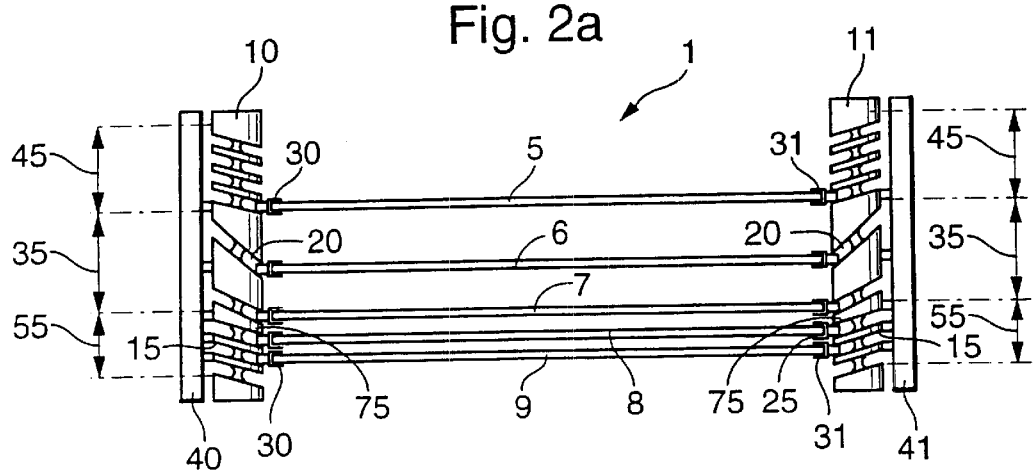
FIG. 2a shows a side view of a second exemplary embodiment of the apparatus according to the present invention.

FIG. 2a depicts a side view of a second exemplary embodiment of an apparatus according to the present invention for holding in readiness and selecting storage disks. This second exemplary embodiment is depicted in FIG. 2b in a plan view. In this context, identical reference characters identify elements identical to those in FIG. 1a and/or FIG. 1b. Proceeding from the arrangement as shown in FIG. 1a and FIG. 1b, hereinafter only the differences of the second exemplary embodiment as compared with the first exemplary embodiment will be explained. For example, storage disks 5–9 as shown in FIG. 2a are supported in grooves 25 of individual and mutually independent sleeves 30–33, sleeves 30–33 having respective openings 80–83 by which one of the four threaded rods 10–13 is respectively guided. Openings 80–83 are guided on their sides facing the respective storage disks 5–9 in flights 20 of the respective associated threaded rods 10–13. As shown by the plan view of FIG. 2b, in the second exemplary embodiment a fourth threaded rod 13 is provided, located opposite third threaded rod 12 with respect to center point 100, corresponding sleeves 30–33 being provided for each threaded rod 10–13. The four threaded rods 10–13 are thus arranged in apparatus 1 with approximately centrical symmetry with respect to center point 100 of storage disks 5–9, respectively spaced approximately 90° from one another. As shown in FIG. 2a and FIG. 2b, four edge regions 70–73 of each storage disk 5–9 inserted into apparatus 1 engage each into a groove 25 of one of the four sleeves 30–33 associated with the respective storage disks 5–9, and thus no longer directly into flights 20 of the individual threaded rods 10–13, as in the first exemplary embodiment. Thus, as shown in FIG. 2a, wider thread flanks 75 are necessary, especially in second region 45 and in third region 55, than in the first exemplary embodiment as shown in FIG. 1a, since in these two regions the storage disks can no longer be stacked so closely on top of one another as in the first exemplary embodiment because of the guidance of the storage disks in grooves 25 of sleeves 30–33. Sleeves 30–33 are guided along threaded rods 10–13 on frames 40–43 associated with threaded rods 10–13, one frame 40–43 being associated with each threaded rod 10–13. Sleeves 30–33 are thereby prevented from rotating as storage disks 5–9 are displaced along threaded rods 10–13. FIG. 2*b* shows, for the example of first storage disk 5, a plan view of apparatus 1 according to the second exemplary embodiment. As shown, sleeves 30–33 each have, on their sides facing away from the storage disk held by them, a recess 90–93 into which the respective frame 40–43 engages to prevent rotation. Frames 40–43 are arranged immovably in apparatus 1.

Figure 4:
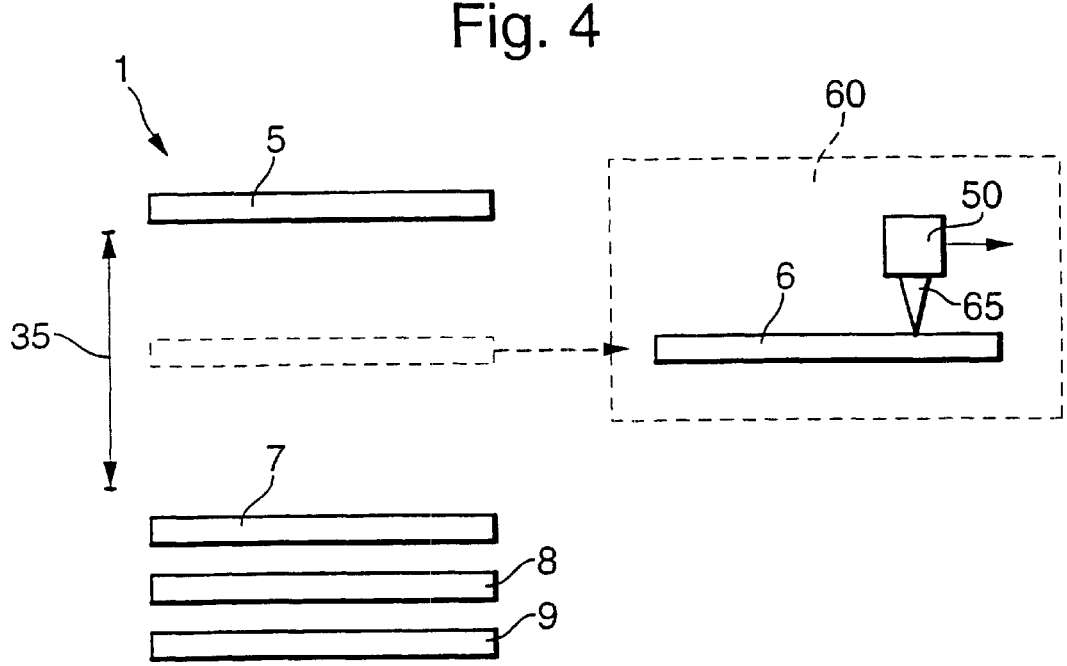
FIG. 4 shows the removal of a storage disk from an apparatus according to the present invention for playback in a playback apparatus.

Apparatus 1 is depicted in FIGS. 3 and 4 in merely stylized fashion. In FIG. 3, a read head 50 of a playback apparatus 60 is introduced into first region 35 of apparatus 1, and via a light beam 65 scans second storage disk 6 located in first region 35 and delivers the read-out data to playback apparatus 60 for analysis and further processing.

In FIG. 4, second storage disk 6 has been transported out of first region 35 of apparatus 1 into playback apparatus 60, as identified by the dashed lines depicting second storage disk 6 in apparatus 1 and the dashed arrow to storage disk 6 which is now located in playback apparatus 60. In playback apparatus 60, second storage disk 6 is scanned by read head 50 using light beam 65, and the read-out data are conveyed to a processing system, as indicated by the arrow pointing away from read head 50. Removal of a storage disk from first region 35 is not possible when four threaded rods 10–13 are used in accordance with the second exemplary embodiment, at least as long as one of the four threaded rods 10–13 cannot be pivoted or pushed aside. The second exemplary embodiment can, however, like the first exemplary embodiment, be implemented with only three threaded rods 10, 11, 12.

In the case of the exemplary embodiments described, playback apparatus 60 is arranged at a fixed height and the one storage disk 5–9 selected for playback is displaced by rotation of threaded rods 10–13 along threaded rods 10–13 into first region 35 at the same height as playback apparatus 60, either to allow read head 50 to penetrate, or for removal of the selected storage disk from first region 35 and for delivery into playback device 60.

What is claimed is:

1. An apparatus for holding in readiness and selecting at least one storage disk, comprising:
    threaded rods having external threads, the at least one storage disk being guided in the external threads, flights of the external threads configured to cooperate with individual edge regions of at least one storage disk to displace the at least one storage disk along the threaded rods when the threaded rods are each rotated about a longitudinal axis thereof.

2. The apparatus according to claim 1, wherein the at least one storage disk is guided directly in the flights of the external threads of the threaded rods.

3. The apparatus according to claim 1, further comprising:
    individual and mutually independent sleeves having grooves, the at least one storage disk being supported in the grooves of the sleeves, the sleeves being guided in the flights of the external threads of the threaded rods.

4. The apparatus according to claim 3, further comprising:
    frames, the sleeves being guided along the threaded rods on the frames.

5. The apparatus according to claim 1 wherein the external threads are configured in a same direction.

6. The apparatus according to claim 1, wherein the threaded rods are one of i) made from elastic material, and ii) coated with elastic material.

7. The apparatus according to claim 1, wherein the at least one storage disk is guided with zero clearance in the flights of the external threads of the threaded rods.

8. The apparatus according to claim 1, wherein a first region of the external threads has a much greater pitch than other regions of the external threads.

9. The apparatus according to claim 1, wherein a read head of a playback apparatus is introduced into the first region.

10. The apparatus according to claim 8, wherein the at least one storage disk is conveyed from the first region to a playback apparatus.

* * * * *